April 17, 1962  J. D. DE SHAZO  3,029,736
RESTRICTING MATERIAL FOR SOLID ROCKET PROPELLANT
Filed Dec. 26, 1957
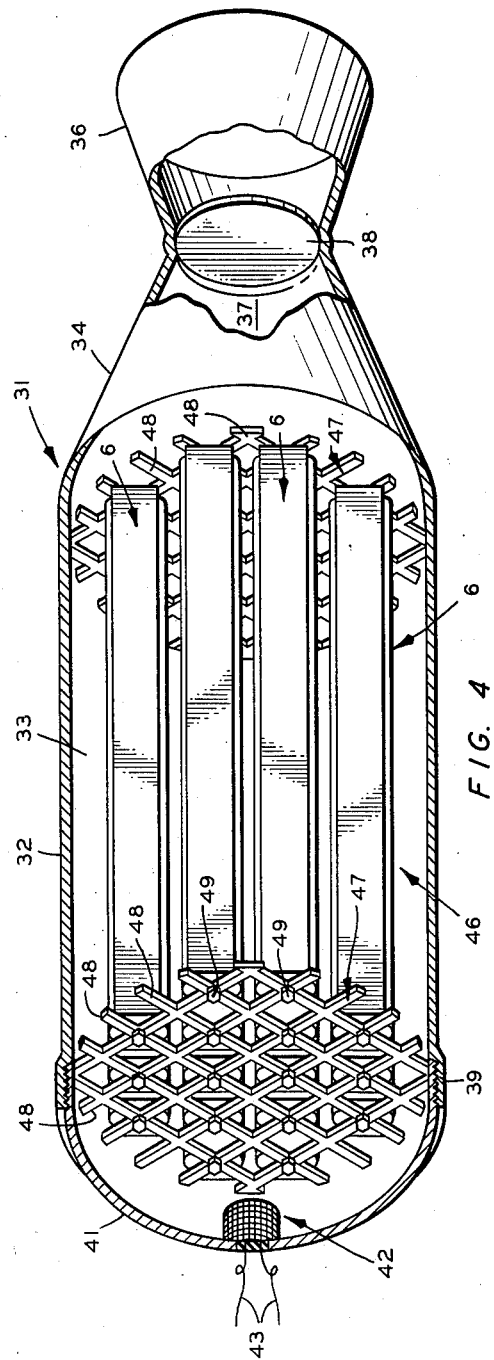
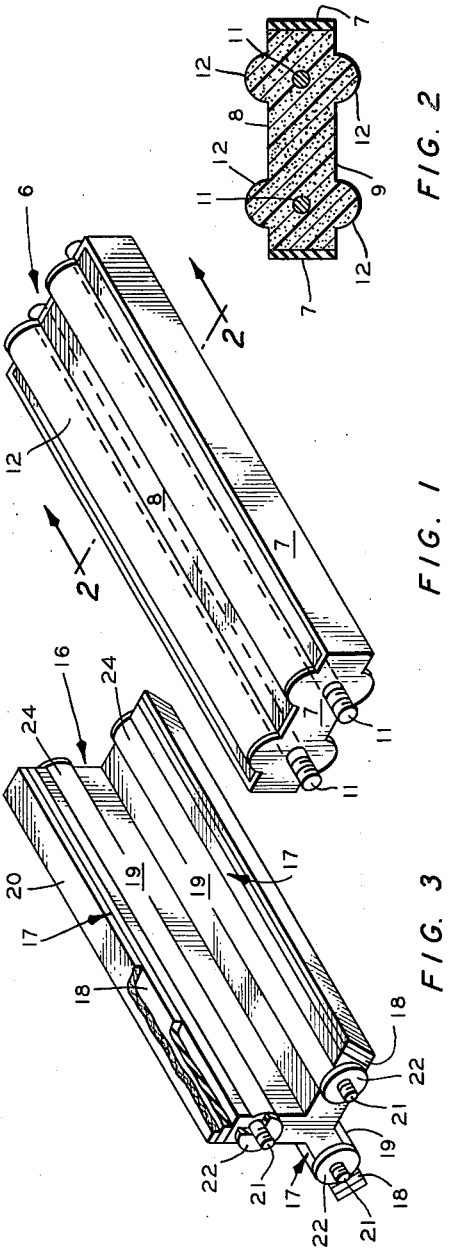
INVENTOR.
J.D. DE SHAZO
BY Hudson E. Young
ATTORNEYS

United States Patent Office 3,029,736
Patented Apr. 17, 1962

3,029,736
RESTRICTING MATERIAL FOR SOLID
ROCKET PROPELLANT
James D. De Shazo, Pasadena, Tex., assignor to Phillips
Petroleum Company, a corporation of Delaware
Filed Dec. 26, 1957, Ser. No. 705,465
8 Claims. (Cl. 102—98)

This invention relates to a restricting material for solid rocket propellant. In another aspect it relates to grains of solid rocket propellant having exposed burning surfaces and other surfaces covered with a novel restricting material so as to limit the burning of the grain to said exposed burning surfaces.

Grains of solid rocket propellant generally are fabricated with some of their surfaces exposed so to serve as burning surfaces which are ignited during operation of a rocket motor. In order to control the burning or consumption of the grain, other surfaces are covered with relatively non-combustible materials, generally referred to in the art as burning restricting materials, to prevent ignition of these other surfaces. Many of the restricting materials used heretofore have been found wanting in fulfilling certain desired requirements.

Accordingly, an object of this invention is to provide a novel restricting material for solid rocket propellant. Another object is to improve the control over the burning or consumption of grains of solid rocket propellant. Another object is to provide restricting material for solid rocket propellants, which material will retain its desired properties notwithstanding the severe conditions arising during operation of a rocket motor. Another object is to provide a grain of solid rocket propellant having some of its surfaces exposed to serve as burning surfaces and other surfaces covered with novel restricting material. A further object is to provide a rocket motor loaded with one or more grains of solid propellant, said grains being restricted in a novel manner.

Other objects and advantages of this invention will become apparent to those skilled in the art from the following discussion, appended claims and drawing in which:

FIGURE 1 is an isometric view of a slab-type grain of solid rocket propellant restricted according to this invention;

FIGURE 2 is a cross-sectional view of FIGURE 1 taken along the plane indicated;

FIGURE 3 is an isometric view of a triform-shaped grain of solid rocket propellant restricted according to this invention; and FIGURE 4 is an elevational view in partial section of a rocket motor loaded with a plurality of grains restricted according to this invention, such as the grain illustrated in FIGURE 1.

Referring to the drawing now, in which like parts have been designated with like reference numerals, and initially to FIGURES 1 and 2, a slab-type grain generally designated 6 is shown. Rocket grain 6 has a generally rectangular parallelepiped configuration with its two ends and sides covered with and adhesively bonded to the burning restricting material 7 of this invention. A sheet of asbestos paper or material can be adhesively bonded in turn to the outer surface of each piece of restrictor material. The oppositely disposed upper surface 8 and lower surface 9 are exposed and unrestricted and serve as initial burning surfaces of the grain. Grain 6 is preferably provided with one or more longitudinally aligned metal support rods 11 which pass through the propellant material of the grain and protrude from the ends thereof, the protruding ends of the rods preferably being threaded. The upper and lower exposed surfaces 8, 9 are preferably provided with two ribs or protuberant portions 12 which are also exposed and form portions of the respective upper and lower surfaces of the grain. Ribs 12 are longitudinally and vertically aligned with support rods 11 and the surface area of the ribs is equal to or slightly greater than surface area of the perforations provided in the grain for the internal support rods 11. Grain 6 is illustrative of the types of grains which can be restricted according to this invention, the particular grain shown in FIGURES 1 and 2 being of the external-burning type often referred to in the art as the double-web type. When such grains are loaded in the rocket motor and the latter is fired, the exposed burning surfaces 8 and 9 are ignited and the propellant material of the grain is consumed on both sides thereof in relatively parallel layers, as is well known in the art. The restricting material of this invention is relatively non-combustible or has a very low burning rate compared to that of the propellant material making up the grain. The restricting material is capable of being securely bonded to the desired surfaces of the grain and is flame and pressure resistant. Moreover, despite the severe conditions encountered during operation of a solid propellant rocket motor, the restricting material will retain its desired properties for relatively long durations and is fairly easy to apply in an inexpensive manner.

Referring now to FIGURE 3, another type of rocket grain of solid propellant generally designated 16 is shown and represents another type of grain which can be restricted according to this invention. Grain 16 has a triform shape and can be referred to as a triform. Grain 16 has three radiating arms 17, each arm being preferentially spaced about 120° from adjacent arms. The extremities of each arm or the tops thereof are covered with and adhesively bonded to the burning restricting material 18 of this invention while the sides 19 of each arm are exposed and serve as burning surfaces. Grain 16 can be provided with one or more support rods, preferably one longitudinal support rod 21 passing through each of the arms 17. The protruding ends of each of the support rods are also preferably threaded as shown. Adhesively bonded to the ends of grain 16 adjacent each of the protruding ends of support rods 21 are disk-like members 22 made of the restricting material of this invention. Those portions of the ends of grain 16 which are not covered with restricting material are exposed and also serve as burning surfaces. The sides 19 of each arm 17 are also provided with longitudinally extending ribs 24 so as to compensate for the perforations in each arm in which the support rods are positioned. Grain 16 is also of the external-burning type, each arm having two oppositely disposed burning surfaces which are ignited upon firing of the rocket motor, the propellant material of each arm being consumed in relatively parallel layers.

It is to be understood that other solid rocket grains can be similarly restricted according to this invention and the latter is not to be limited to those grains illustrated herein. For example, cylindrical grains of solid propellant with or without axial perforations can have some of their surfaces restricted according to this invention. The grains shown in FIGURES 1–3 are preferred and represent embodiments of this invention which have been restricted according to this invention.

FIGURE 4 illustrates a rocket motor generally designated 31. Rocket motor 31 has a generally cylindrical metal casing 32 defining a combustion chamber 33. The rear or aft end of casing 32 is reduced or tapered at 34 and is connected to a reaction nozzle 36, the latter being either integral with reduced casing portion 34, as shown, or separable and connected to casing portion 34 by suitable means, such as bolted flanges. Casing portion 34 and nozzle 36 define a converging-diverging passage 37 of the DeLaval type which communicates with combustion chamber 33. Positioned anywhere along passage 37, preferably across its throat, is a thin circular starter disk 38 made of metal or plastic designed to function when the pressure in the combustion chamber 33 reaches a predetermined pressure, generally designated as starter disk bursting pressure. The other or head end of casing 32 is preferably constructed in the form of an annular flange 39 which is secured to a suitable head closure member 41 by means of threads, welding, or the like. Positioned anywhere in the combustion chamber 33, and preferably in the head end thereof, is one or more igniters, such as igniter generally designated 42 which is axially connected to head closure member 41 and projects inwardly into the combustion chamber 33. Igniter 42 is preferably in the form of a frangible wire container or cup and contains suitable ignition material, such as black powder or the like. A suitable igniter which is preferred is that disclosed and claimed in co-pending application, Serial No. 591,340, filed June 14, 1956, by B. R. Adelman. The igniter 42 has suitable electrical wires 43 which pass through head closure member 41 and can be connected to a suitable external electrical power source. Loaded within combustion chamber 33 is a propellant charge generally designated 46 comprising a plurality of longitudinally and spatially aligned grains of solid rocket propellant restricted in accordance with this invention, such as grains 6 of FIGURE 1. Grains 6 can be arranged in any suitable manner, but preferably are arranged in a generally symmetrical pattern. The protuberant portions of the longitudinal support rods of grains 6 pass through suitable grids or support plates generally designated 47 at either end of charge 46. Preferably, the support grids 47 are formed from a plurality of cross bars 48 which are provided with suitable openings through which the protuberant portions of the support rods of grain 6 pass. Secured to the ends of the support rods are any suitable means such as nuts 49 which are securely fastened so as to maintain the grains in fixed position.

While FIGURE 4 illustrates a single propellant charge or bundle of grains, it is to be understood that the rocket motor of this invention can be loaded with a plurality of such charges arranged in a tandem fashion, with each bundle or charge having the same or a different number of grains so as to vary the volumetric loading density from one charge to the next. It is evident that the grains of FIGURE 3 can be similarly loaded and supported in the combustion chamber of rocket motor 31, but for purposes of brevity have not been so illustrated.

In operation, the rocket motor of FIGURE 4 is fired by closing a suitable switch in an electrical circuit to which electrical wires 43 are connected. Subsequently, igniter 42 functions and the ignition products burn and are released from the igniter and flow into the combustion chamber 33. The hot combustion products from the igniter 42 immediately propagate throughout the combustion chamber 33 and heat is transferred therefrom to the exposed surfaces of the grains 6, such as exposed burning surfaces 8 and 9 of FIGURE 1, raising the temperature thereof to an ignition temperature. Consequently, the propellant material of each grain 6 begins to burn and is consumed, burning of the grains on surfaces other than the exposed burning surfaces being prevented by reason of the restricting material of this invention, such as restricting material 7 of FIGURE 1. The burning propellant material of the grains 6 generates combustion gases which raise the temperature and pressure within the combustion chamber 33. When a predetermined starter disk bursting pressure is reached, e.g., 250–300 p.s.i., the starter disk 38 functions, for example by rupturing and expulsion from the reaction nozzle 36. The pressure within the combustion chamber 33 then levels out at an operating or working pressure, e.g., 500–1000 p.s.i., and the combustion gases pass at a high velocity through the open passage 37, thereby imparting thrust to the rocket motor. The propellant material of grains 6 continues to burn until such time as all of the propellant material is consumed.

The rocket grains restricted in accordance with the practice of this invention will have improved burning characteristics. The burning of the grains is limited to the initially exposed burning surfaces by reason of the restricting material of this invention, which material will remain positively bonded to the propellant material until complete burnout. This restriction material is flame and pressure resistant and can be applied in an economical fashion. This restricting material has good hot aging properties and is relatively easy to fabricate. One other advantage of the restricting material of this invention lies in the fact that it can be cured without the use of curing agents, such as sulfur.

The novel restricting material of this invention comprises: a rubbery copolymer of a vinyl heterocyclic nitrogen compound with an open chain conjugated diene (preferably a 90/10 1,3-butadiene/2-methyl-5-vinylpyridine copolymer); a chloroprene polymer; and a filler.

The rubbery copolymer of the vinyl heterocyclic nitrogen compound with an open chain diene utilized in restrictor recipes of this invention are those copolymers disclosed in co-pending application, Serial No. 284,447, filed April 25, 1952, by W. B. Reynolds et al. The heterocyclic nitrogen bases include the

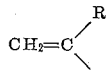

substituted heterocyclic bases where R is a hydrogen or methyl radical. The vinyl-substituted heterocyclic nitrogen bases of the pyridine and quinoline series having only one vinyl substituent group and their various alkyl-substituted derivatives are preferred, wherein the total number of carbon atoms in the nuclear alkyl substituents is not more than 12. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable. The conjugated dienes employed are those containing 4 to 6 carbon atoms per molecule and representatively include 1,3-butadiene, isoprene, 2,3-dimethyl-1,3-butadiene, and the like.

In the preparation of the copolymers, the amount of conjugated diene employed is in the range between 75 and 95 parts by weight per 100 parts monomers and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML–4) plasticity value in the range of 10–40, preferably in the range of 15 to 25.

The chloroprene polymers utilized in the restrictor recipes of this invention are 2-chloro-1,3-butadiene polymers having great resistance to crystallization and desirable high temperature aging resistance. A preferred chloroprene polymer of this type is known in the trade as neoprene WRT manufactured by E. I. de Pont de Nemours and Company, Inc.

Suitable fillers which can be incorporated in the restrictor recipes of this invention include carbon black, such as Philblack A, silicon dioxide, zinc oxide and asbestos. Another material which can be employed as a filler and which has smoke depressant characteristics is magnesium oxide.

Other ingredients which can be incorporated in restrictor recipes of this invention include various plasticizers, such as ZP-211 (dibutoxyethoxyethyl formal which has been topped to remove low boiling material), Hepteen Base (reaction product of heptaldehyde and aniline), etc. Various antioxidants can also be incorporated, such as Flexamine (a physical mixture containing 65 percent of a complex diarylamine-ketone reaction product and 35 percent of N,N'-diphenyl-p-phenylene diamine). Suitable stabilizers which can be incorporated include Ferro Stabilizer 1203 (barium or cadium liquid soap stabilizer).

Generally, the restricting materials of this invention have recipes or compositions such as set forth in Table I.

Table I

| | [1] Parts per 100 parts rubber |
|---|---|
| Vinyl heterocyclic nitrogen base/conjugated diene copolymer | 50–75 |
| Chloroprene polymer | 50–25 |
| Filler | 20–60 |
| Plasticizer | 0–10 |
| Antioxidant | 0–5 |
| Stabilizer | 0–1.5 |

[1] Said 100 parts rubber being equal to the total parts of said polymer and said chloroprene polymer.

In the higher range of the vinyl heterocyclic nitrogen base/diene copolymer, e.g., 60–75 phr., the plasticizer content can be omitted. The antioxidant and stabilizer can be incorporated to provide better hot aging properties. The restrictive recipe does not contain any curing agent for the rubber as the same is self-curing at elevated curing temperatures.

Specific restrictor compositions or recipes found to be of particular value are those set forth in Table II.

Table II

| | Parts per 100 Parts Rubber [c] | | | | | | | |
|---|---|---|---|---|---|---|---|---|
| | A | B | C | D | E | F | G | H |
| Butadiene/methylvinylpyridine, 90/10 | 75 | 75 | 75 | 75 | 50 | 50 | 50 | 50 |
| Neoprene WRT | 25 | 25 | 25 | 25 | 50 | 50 | 50 | 50 |
| Philblack A | 25 | 25 | 25 | 25 | 30 | 30 | 30 | 30 |
| Silicon dioxide | | | | | | 25 | | |
| Asbestos | | | | [a] 25.9 | [b] 75 | | | |
| ZP-211 | | | | | 10 | 10 | 10 | 10 |
| Hepteen base | | | | | 2 | 5 | 2 | |
| Flexamine | 5 | 4.3 | 4.3 | 4.3 | | | | |
| Ferro stabilizer 1203 | 1 | 0.9 | | | | | | |
| Magnesium oxide | | | | | | | | |

[a] Asbestos shorts.
[b] Asbestos powder.
[c] Said 100 parts rubber being equal to the total parts of said butadiene/methylvinylpyridine and said neoprene WRT.

Adhesives which can be used to adhesively bond the restrictor materials of this invention to the desired surfaces of the solid rocket propellant grains include any adhesives which will effect a reliable bond and which is capable of withstanding the extreme operational pressures and temperatures encountered either during storage of the fabricated grains or during operation of the rocket motor. A particular adhesive found to be useful is known in the trade as EC-1300. Another adhesive which was found to effect a reliable bond is that set forth in Table III:

Table III

| | Weight percent |
|---|---|
| Methyl ethyl ketone | 85.00 |
| Paracril D [1] | 7.39 |
| Schenectady Resin (SP-6601) [2] | 0.22 |
| Flexamine | 7.39 |

[1] A butadiene/acrylonitrile rubber having a nitrile content in excess of 35 wt. percent.
[2] A phenol formaldehyde resin.

The restricting materials can be applied to the solid rocket grains in any desired manner. A preferred method proven to be especially effective is described as follows. Uncured grains of solid rocket propellant are obtained and those surfaces to be restricted are cleaned to remove dust and foreign matter, preferably by wiping with acetone. A thin film of adhesive is applied to that surface of the grain to be restricted. The sheet of restrictor is positioned on top of the adhesive-coated surface of the grain and pressure applied thereto. Pressure can be applied in any convenient manner, for example, simply by resting the grain on its restricted side. The restricted grain is then cured at elevated temperatures, during which time the propellant material and adhesives are concomitantly cured. Alternatively, a cured grain is restricted as described above, and then the bond is cured at elevated temperatures. The restricting material itself can be concomitantly cured with the propellant material and adhesive or, alternatively, the restricting material applied to the grain can be previously cured. It has been found desirable in some instances to also adhesively bond to the external surface of the restricting material a thin sheet (e.g., 0.04 inch) of asbestos paper which can be bonded with the same or different adhesive.

The grains restricted in accordance with this invention can be fabricated from any suitable solid rocket propellant by extrusion, molding, or casting. The preferred grains of this invention are extruded from composite-type solid rocket propellant comprising a major amount of a solid oxidizer and a minor amount of a binder material. Suitable solid oxidizers include the alkali metal, alkali ether metal, and ammonium salts of nitric, perchloric and chloric acids, such as ammonium nitrate, ammonium perchlorate, lithium perchlorate, sodium nitrate, potassium nitrate, etc., and mixtures thereof. Preferred solid rocket propellant compositions of the composite type are those disclosed and claimed in said co-pending application, Serial No. 284,447, filed April 25, 1952, by W. B. Reynolds et al., now abandoned, and those disclosed and claimed in co-pending application, Serial No. 561,943, filed January 27, 1956, by W. B. Reynolds et al. The propellant compositions disclosed in these co-pending applications comprise a rubbery copolymer of a vinyl heterocyclic nitrogen base compound with an open chain conjugated diene.

The following empirical formulation or recipe generally represents the class of propellant compositions preferred for the preparation of the propellant grains of this invention:

Table IV

| Ingredient | Parts per 100 parts or rubber | Parts by Weight |
|---|---|---|
| Binder | | 10–25 |
| Copolymer (Bd/MVP) | 100 | |
| Philblack A (a furnace black) | 10–30 | |
| Plasticizer | 10–30 | |
| Silica | 0–20 | |
| Metal oxide | 0–5 | |
| Antioxidant | 0–5 | |
| Wetting Agent | 0–2 | |
| Accelerator | 0–2 | |
| Sulfur | 0–2 | |
| Oxidizer (Ammonium nitrate) | | 75–90 |
| Burning rate catalyst | | 0–30 |

Suitable plasticizers useful in preparing these propellant grains include TP-90-B (dibutoxyethoxyethyl formal supplied by Thiokol Corp.); benzophenone; and Pentaryl A (monoamylbiphenyl). Suitable silica preparations include a 10–20 micron size range supplied by Davison Chem. Co.; and Hi-Sil 202, a rubber grade material supplied by Columbia-Southern Chem. Corp. A suitable antioxidant is Flexamine, a physical mixture containing 25 percent of a complex diarylaminoketone reaction product and 35 percent of N,N'diphenyl-p-phenylenediamine, supplied by Naugatuck Chem. Corp. A suitable wetting agent is Aerosol-OT (dioctyl sodium sulfosuccinate, supplied by American Cyanamid Co.). Satisfactory rubber cure accelerators include Philcure 113 (N,N-dimethyl-S-tertiary butylsulfenyl dithiocarbamate); Butyl-8 (a dithiocarbamate-type rubber accelerator supplied by R. T. Vanderbilt Co.); and GMF (quinone dioxime, supplied by Naugatuck Chem. Co.).

Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, milori blue, Turnbull's blue, Chinese blue, new blue, Antwerp blue, mineral blue, Paris blue, Berlin blue, Erlanger blue, foxglove blue, Hamburg blue, laundry blue, washing blue, Williamson blue, and the like. Other burning rate catalysts such as ammonium dichromate, potassium dichromate, sodium dichromate, ammonium molybdate, and the like, can also be used.

Various modifications and alterations of this invention will become apparent to those skilled in the art without departing from the spirit and scope of this invention; and it is to be understood that the foregoing discussion and accompanying drawing merely represent preferred embodiments of this invention.

I claim:

1. A grain of solid rocket propellant, said grain have some of its external surface exposed to serve as a burning surface and other surface covered with restricting material adhesively bonded thereto, the latter comprising a rubbery copolymer of a polymerizable

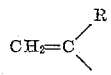

substituted heterocyclic nitrogen base and a copolymerizable conjugated diene having 4 to 6 carbon atoms per molecule, a polymer of 2-chloro-1,3-butadiene, and a filler, said heterocyclic nitrogen base selected from the group consisting of pyridine, quinoline, alkyl substituted pyridine, and alkyl substituted quinoline wherein the total number of carbon atoms in the nuclear alkyl substituents is not more than 12 and wherein R is selected from the group consisting of hydrogen and a methyl radical, said filler being selected from the group consisting of carbon black, silicon dioxide, zinc oxide, magnesium oxide, and asbestos.

2. A grain of solid rocket propellant according to claim 1 wherein said copolymer amounts to 50–75 parts/100 parts rubber, said polymer of 2-chloro-1,3-butadiene amounts to 50–25 parts/100 parts rubber, and said filler amounts to 20–60 parts/100 parts rubber, said 100 parts rubber being equal to the total parts of said copolymer and said 2-chloro-1,3-butadiene polymer.

3. A grain of solid rocket propellant according to claim 2 wherein said copolymer is 1,3-butadiene/2-methyl-5-vinylpyridine, and said filler is carbon black.

4. A grain of solid rocket propellant according to claim 3 wherein said restricting material further comprises a plasticizer in the amount of 0–10 parts/100 parts rubber, an antioxidant in the amount of 0–5 parts/100 parts rubber, and a stabilizer in the amount of 0–1.5 parts/100 parts rubber.

5. A grain of solid rocket propellant, said grain have some of its external surface exposed to serve as a burning surface and other surface covered with restricting material, the latter comprising a 90/10 1,3-butadiene/2-methyl-5-vinylpyridine copolymer in the amount of about 50 parts/100 parts rubber, a polymer of 2-chloro-1,3-butadiene in the amount of about 50 parts/100 parts rubber, carbon black in the amount of about 30 parts/100 parts rubber, and topped dibutoxyethoxyethyl formal in the amount of about 30 parts/100 parts rubber, said 100 parts rubber being equal to the total parts of said copolymer and said 2-chloro-1,3-butadiene polymer.

6. A grain of solid rocket propellant of the composite type comprising a major amount of an oxidant and a minor amount of a rubbery binder, said grain having oppositely disposed exposed surfaces serving as burning surfaces and other surfaces covered with restricting material adhesively bonded thereto, said restricting material comprising a 90/10 1,3-butadiene/2-methyl-5-vinylpyridine copolymer in the amount of about 50 parts/100 parts rubber, a polymer of 2-chloro-1,3-butadiene in the amount of about 50 parts/100 parts rubber, and carbon black in the amount of about 30 parts/100 parts rubber, said 100 parts rubber being equal to the total parts of said copolymer and said 2-chloro-1,3-butadiene polymer.

7. A grain according to claim 6 wherein said grain has a rectangular parallelepiped configuration with its top and bottom serving as said exposed burning surfaces, and the ends and sides of said grain are covered with said restricting material.

8. A grain according to claim 6 wherein said grain has a triform configuration comprising three equally circumferentially spaced radiating arms, the sides of each arm serving as said exposed burning surfaces, and the top surfaces of each said arm are covered with said restricting material.

References Cited in the file of this patent

UNITED STATES PATENTS

| | | |
|---|---|---|
| 2,402,020 | Cislak | June 11, 1946 |
| 2,482,307 | Walker | Sept. 20, 1949 |
| 2,484,355 | Parsons | Oct. 11, 1949 |
| 2,514,194 | Cline | July 4, 1950 |
| 2,661,692 | Vegren | Dec. 8, 1953 |
| 2,713,768 | Livingston et al. | July 26, 1955 |
| 2,783,138 | Parsons | Feb. 26, 1957 |
| 2,860,120 | Pritchard et al. | Nov. 11, 1958 |
| 2,877,504 | Fox | Mar. 17, 1959 |
| 2,918,940 | Carr | Dec. 29, 1959 |

OTHER REFERENCES

| | | |
|---|---|---|
| 654,688 | Great Britain | June 27, 1951 |